Jan. 17, 1967  W. SCHLAPP  3,298,295
OBJECTIVE WITH RESILIENT DIAPHRAGM
Filed April 10, 1964  3 Sheets-Sheet 1

INVENTOR
WERNER SCHLAPP

By Toulmin & Toulmin
Attorneys

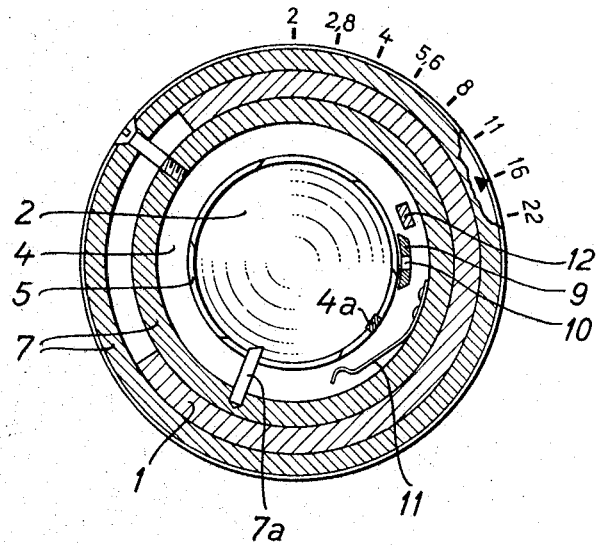
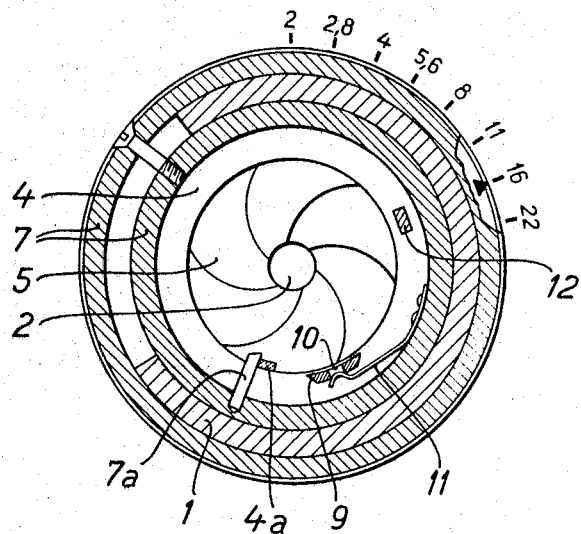

Jan. 17, 1967  W. SCHLAPP  3,298,295
OBJECTIVE WITH RESILIENT DIAPHRAGM
Filed April 10, 1964  3 Sheets-Sheet 3

INVENTOR
WERNER SCHLAPP

By Toulmin & Toulmin
Attorneys

United States Patent Office 3,298,295
Patented Jan. 17, 1967

3,298,295
OBJECTIVE WITH RESILIENT DIAPHRAGM
Werner Schlapp, Asslar, Kreis Wetzlar, Germany, assignor to Ernst Leitz G.m.b.H., Wetzlar, Germany
Claims priority, application Germany, May 24, 1963,
L 44,933
Filed Apr. 10, 1964, Ser. No. 358,701
8 Claims. (Cl. 95—64)

The present invention relates to the diaphragm for a picture taking lens and more particularly it relates to improved diaphragm control for preset diaphragms which are spring urged to the preselected apertures when actuated by the shutter or by the tilting out motion of a mirror in mirror reflex cameras.

In picture taking lenses or objectives of this kind there is generally a diaphragm pre-selector ring and two diaphragm blade rings having blades between them which form the various apertures or $f$ stops. One of said two blade rings is usually fixed to the lens mounting, whereas the other one is rotatably mounted and is acted upon by the force of a spring to urge it into a position to effect the smallest diaphragm aperture. Also associated with this structure is a member which is connected with a viewing mirror on the camera or the shutter mechanism and which maintains the rotatable blade ring in a position of greatest diaphragm opening against the force tending to urge the blade ring to a position of the smallest aperture. This generally enables viewing through the lens to be done with a maximum amount of light coming through.

As soon as the mirror is tilted in preparation for taking the picture, the blade ring is released and it will then turn under the pull of the spring until a stop member attached to it will hit another stop member found on the pre-selector ring of the diaphragm; and in this way the diaphragm closes. As soon as the diaphragm is closed, the shutter is released.

The time passing between the swinging-out of the mirror and the release of the shutter, of course, must be great enough in order that the diaphragm, if so desired, may become closed all the way down to its smallest opening. On the other hand, this length of time should not be much greater, so as to maintain the time parallax or lapse between actuation of the shutter release and the true act of closing as little as possible. This simply means that as soon as the diaphragm has been closed to its smallest opening, the shutter must go into motion. The time difference between these two process is $\frac{1}{100}$ to $\frac{2}{100}$ seconds.

Thorough experiments have indicated that when this stop member, which forms one piece with the blade ring hits the stop member of the pre-selector ring, the blade ring does a rebounding motion which makes itself felt rather disagreeably especially at small diaphragm openings. The opening of the diaphragm becomes contracted at first to the pre-selected value, but right thereafter it becomes a little bit enlarged, and only thereafter will it return to the pre-selected value at which it will then come to rest. Since the diaphragm is closed with respect to time so shortly ahead of the shutter release, the recoiling or rebounding of the diaphragm will occur during the opening of the shutter. This means that at least during part of the exposure time, one takes the photographic picture not with the selected diaphragm opening, but with one which is up to 50 percent greater.

This jarring blow may be attentuated somewhat by using a stronger spring on the blade ring; however, the improvement does not amount to too much, and furthermore, it introduces other setbacks. It is quite true that a stronger spring catches the jarring blow somewhat better than a weaker, one; however, it leads to one cam hitting the other one with a stronger force, so that the damping or attentuation obtained in the long run is actually rather small. A stronger spring causes heavier jarring inside the camera, and requires a much greater driving force inside the gear system, for getting tension again imparted to the blade ring when it is set back; these simply are phenomena which are quite undesirable.

An object of this invention is, therefore, to eliminate the jarring and recoiling of the diaphragm when it is stopped down to its preset aperture. This is accomplished by a blocking or braking device for the blade ring which prevents the ring from snapping or recoiling back after the diaphragm has been closed.

For such a braking device one may employ preferably a stiff leaf spring which is attached to one side of the diaphragm pre-selector ring, which spring brakes the speed of the blade ring before it hits the diaphragm pre-selector ring. Furthermore, the leaf spring may serve as a detention spring to detain the blade ring after it has hit the diaphragm pre-selector ring.

Because the diaphragm error due to the jarring below at smaller diaphragm apertures becomes felt more strongly than at the larger ones, the invention has been developed still further by providing means for making the blocking or braking devices mentioned above ineffective for larger apertures or $f$ stops.

This is accomplished by providing a lift-out device which is stationarily placed into the lens mounting and which cooperates with the leaf spring so that, upon the adjusting of the diaphragm pre-selector ring to one of the diaphragm openings located between the maximum opening and an average diaphragm opening, the lift-out device will push back the spring and render it ineffective.

Because the blade ring moves a relatively short distance when it progresses from its position of greatest diaphragm opening to a position for an average diaphragm setting, it does not reach a speed fast enough to create a large jarring blow. Furthermore, between the reaching of one of the average diaphragm openings and the starting of the operation of the shutter, a correspondingly longer time must pass so that the diaphragm has already come to rest before the shutter starts to operate.

The jarring blow may also be prevented by a form locking blocking device. This latter one, according to the invention, consists of a peg which is placed upon the blade ring and of a pawl which is supported on the diaphragm pre-selector ring. As soon as the blade ring hits the diaphragm pre-selector ring, the lock will drop behind said peg and prevent a rebound.

Before the blade ring is returned into the position of greatest diaphragm opening by a driving member which is coupled to the mirror or also to the winding of the shutter, the pawl, of course, must be unblocked. In order to accomplish this at the blade ring, a lift-out part is used. It is constructed as a two armed lever which is maintained in a terminal tilting possition. One lever arm cooperates with said driving member, whereas the other lever arm acts upon the pawl to release it from the peg on the blade ring.

Other advantages of this invention will become more apparent from the following detailed description and accompanying drawings wherein:

FIGURES 2a to 2c are sections through FIGURE 1 along the line II—II, which show the diaphragm preselector ring and the blade ring in several steps of their operations;

Figure 1:
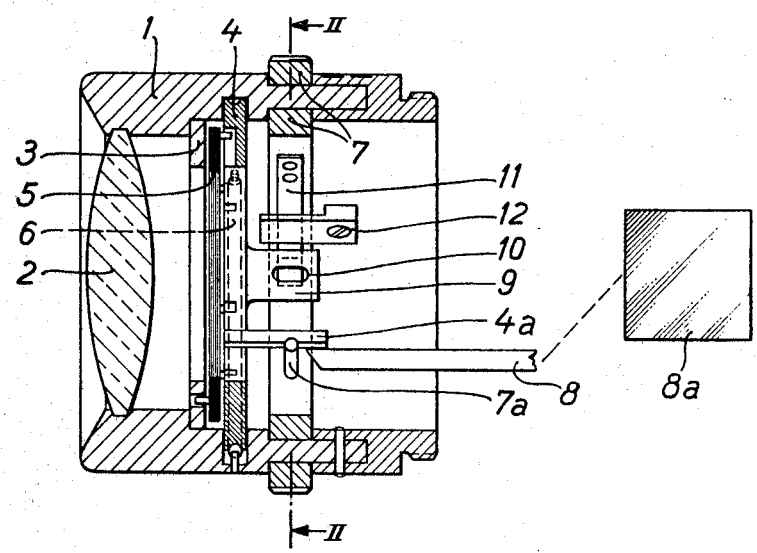
FIGURE 1 shows schematically the object lens with spring actuated diaphragm blade ring and a leaf spring on the diaphragm pre-selector ring for braking the motion of the blade ring and for maintaining it in the stopped position.

Referring to the drawings in more detail, in FIGURE 1 the numeral 1 denotes the lens mounting which contains an optic 2 as well as diaphragm means consisting of a blade ring 3 which is joined to the mounting 1, and further consists of a movable blade ring 4 and the lamellae 5 which are guided between the blade rings 3 and 4. A spring 6 engages the movable blade ring 4 and urges it into the position of the smallest diaphragm opening.

Figure 2A:
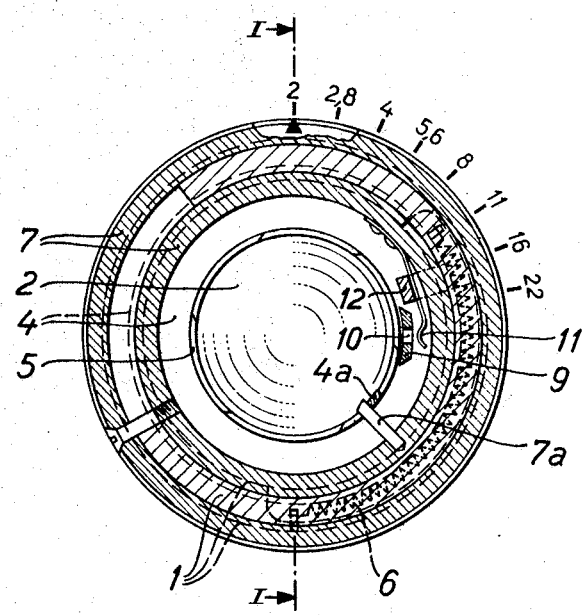

In the drawings, FIGURES 2a to 2c, the spring 6 urges the blade ring 4 in a clockwise direction. A stop 4a is rigidly attached to the blade ring 4. Another stop 7a or abutment means is secured to the pre-selector ring 7 which has the usual f stop indication means thereon. The stops or abutment means 4a and 7a along the blade rings 3 and 4, the pre-selector ring 7, and spring 6, cooperate to adjust the aperture in known manner.

Part of the diaphragm means with a spring action is also formed indirectly by a driving member 8 which is located in the camera and which is coupled either with the mirror or with the shutter setter of a mirror reflex camera (shown schematically as 8a) in known manner.

The driving member 8 is connected to the stop 4a of the blade ring 4 so as to maintain the blade ring in the position of the greatest diaphragm opening against the force of the spring 6 when the camera is in the observation position. Member 8 will release this blade ring as soon as the shutter is tripped or as soon as the mirror has been tilted out of the observation position.

Furthermore, there is connected to the movable blade ring 4 a lug 9 which is equipped with a slotted hole 10 which serves as the groove in which a leaf spring 11 comes to rest. Spring 11 has one of its ends attached to the inner ring of the pre-selector ring 7 as shown. The lug 9 and the spring 11 together form one embodiment of the braking and retaining device which acts upon the blade ring 4.

How this braking setup functions may be recognized best from FIGURES 2a to 2c. FIGURE 2a shows one phase of the operation in which the blade ring 4 lies in the position of the greatest diaphragm opening. In the example shown this is the diaphragm opening or f stop 2. This ring is retained in this position by the driving member 8, which is not shown on FIGURES 2a to 2c.

Independently of this position of the blade ring 4, the pre-selector ring 7, too, is in a position at which the greatest diaphragm is preselected. The stop 7a of the preselector ring 7 and the stop 4a of the blade ring 4 contact each other when the pre-selector ring and the blade ring are in this relative position.

In the position of the pre-selector ring shown in FIGURE 2a the leaf spring 11 will be located underneath the lifting device 12 which is attached to the lens mounting as shown. This lifting device 12 presses the leaf spring 11 away from the lug 9 and prevents the spring from entering into the slotted hole 10.

The lifting device 12 is fixed on the lens mounting so as to act upon the leaf spring 11 when the pre-selector ring 7 is set to one of the larger diaphragms, i.e. between, say f2 and f5.6. For the reasons given earlier, it is not necessary to alleviate the jarring of the diaphragm for large apertures since the variation in area opening is relatively small at large apertures.

In FIGURE 2b the position of the blade ring 4 has not been changed with respect to the position shown in FIGURE 2a; however, the pre-selector ring 7 is now set to diaphragm 16, i.e. the pre-selector ring 7 was turned by a corresponding angle in a clockwise direction.

FIGURE 2c shows one operational phase after the tripping of the shutter. The driving member 8 (not shown) has released the stop 4a of the blade ring so that the blade ring, under the action of the force of the spring 6, has turned clockwise and has closed the diaphragm to the preselected value. The stop 4a of the blade ring 4 has hit against the stop 7a of the pre-selector ring, so that the rotating motion of the blade ring 4 was stopped in known manner at this location which was determined by the position of the stop 7a.

Shortly before the stop 4a hits the stop 7a, however, the lug 9 has interacted with the spring 11 and has thereby braked the rotating motion of the blade ring 4, so that the remaining energy is lessened when the stop 4a hits the stop 7a.

Furthermore, the rounded extremity of spring 11 drops into hole 10 at the moment when the stop 4a and the stop 7a collide with each other, and in this way retain the blade ring 4 in the pre-selected position. Both functions of the spring, therefore, bring about a decrease of the colliding force, and shortly after abutment, the rebounding is prevented because the blade ring becomes braded or locked in place.

Figure 3:
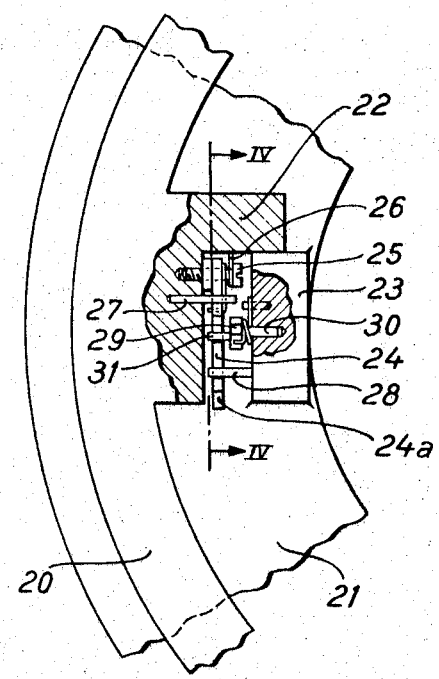
FIGURE 3 shows schematically parts of the diaphragm pre-selector ring with a second embodiment of the invention using pawl means for preventing rebounding of the blade ring.
Figure 4:
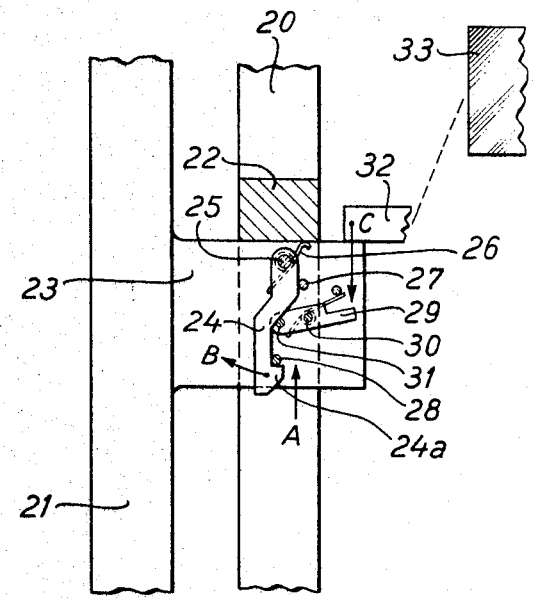
FIGURE 4 is a section through FIGURE 3 along the line IV—IV.

The jarring blow or recoil may be avoided also by a second form of the invention which consists of the locking and blocking of the blade ring. Such a blocking structure is shown schematically in FIGURES 3 and 4. Both figures show portions of the pre-selector ring 20 and the rotatable blade ring 21. The pre-selector ring 20 carries a cam 22 and the blade ring 21 carries a stop 23. At the cam 22 a pawl 24 is supported so that it may turn around a trunnion 25. The pawl is under the action of a spring 26 which urges it to pivot in a counterclockwise direction (FIGURE 4). Therefore, in the rest position, it lies against a peg 27, which is also attached to the cam 22.

The stop 23, on the other hand, carries a peg 28 with which the pawl 24 meshes. When a spring similar to spring 6 urges the blade ring 21 to its pre-selected position, the peg 28 approaches the pawl 24 in the direction of arrow A. The peg 28 will hit the inclined surface 24a of pawl 24 and tilts pawl 24 in the direction of arrow B against the force of the spring 26. This has a tendency to slow down the ring 20 before it abuts a stop. At the very moment when the stop 23 hits the cam 22, the pawl 24 drops behind the peg 28 and in this way prevents a rebounding of the blade ring 21.

At the stop 23 of the blade ring 21 there is a lift-out device which consists of a two armed lever 29 which can be turned around an axle 30 to unlock pawl 24. At the end of one of the arms of this lever there is a peg 31 which engages pawl 24.

The blade ring 21 is rotated back into the position of the greatest diaphragm opening by a driving member shown schematically at 32 and connected to the shutter or mirror tilting mechanism, by known means. The driving members 32 is supported in the camera and when it hits the other arm of this lever 29, it moves the pawl 24 in the direction of arrow C. In this way the lift-out device is turned clockwise, whereby the peg 31 presses the pawl outwardly in the direction of arrow B. This pawl then releases the peg 28 on stop 23 so that the returning of the blade ring may be undertaken.

It will be understood that this invention is susceptible to modification in order to adapt it to different usages and conditions and accordingly, it is desired to comprehend such modifications within this invention as may fall within the scope of the appended claims.

What is claimed is:

1. In combination, a lens mount and an objective lens mounted therein, diaphragm means comprising first ring means rotatably mounted in said mount and having an adjustable aperture therein, preselector ring means rotatably mounted in said mount and adapted for preselecting the desired aperture in said diaphragm means, spring means to rotate said first ring means to a position to effect adjustment of said aperture in accordance with a preselected aperture, and means to prevent variation of said aperture after said spring means rotate said first ring means to said position, said last named means comprising a leaf spring having one end mounted on said preselector ring means and having a second end, lug means mounted on said first ring means to rotate therewith and having an aperture therein, said second end being adapted to engage said lug means to reduce the rotational velocity of said first ring means as it approaches said position and further being adapted to engage the aperture in said lug means when said diaphragm means is fully rotated to said position.

2. The combination as claimed in claim 1 further comprising cam means mounted on said lens mount and adapted to engage said leaf spring to render it ineffective in engaging said lug means for aperture openings between maximum opening and an intermediate opening.

3. In combination, a lens mount and an objective lens mounted therein, diaphragm means comprising first ring means rotatably mounted in said mount and having an adjustable aperture therein, preselector means rotatably mounted in said mount and adapted for preselecting the desired aperture in said diaphragm means, spring means to rotate said first ring means to a position to effect adjustment of said aperture in accordance with a preselected aperture, and means to prevent variation of said aperture after said spring means rotate said first ring means to said position, said last named means comprising, a peg member on said first ring means, spring loaded pawl means pivotally mounted on said preselector ring means and adapted to engage and lock said peg member after said diaphragm means is fully rotated to said position.

4. The combination as claimed in claim 3 in which said pawl means has an inclined surface adapted to engage said peg member to reduce the rotational velocity of said first ring means as it approaches said position.

5. The combination as claimed in claim 3 further comprising means to disengage said pawl means when said ring means is rotated in an opposite direction from the direction of rotation imparted by said spring means.

6. The combination as claimed in claim 5 in which said last named means comprises a lever pivotally mounted on said diaphragm means and having one end adapted to disengage said pawl means from said peg member.

7. In combination, a lens mount and an objective lens mounted therein, diaphragm means comprising a stationary ring mounted in said lens mount and first ring means rotatably mounted in said mount and having aperture lamellae therein, preselector ring means rotatably mounted in said mount and adapted for preselecting the desired aperture in said diaphragm means, cooperating members of abutment means on said first ring means and said preselector ring means, spring means mounted in said mount to rotate said first ring means in a direction to effect engagement of said members, selectively releasable means to maintain said first ring in a position of widest aperture opening against the bias of said spring means and operable to release said first ring means in response to actuation of an actuating member connected therewith, and cooperating elements of latch means on said ring means operable to interengage and hold said first ring means in its rotated position to prevent variation of said aperture lamellae after said spring means has rotated said first ring means to its preselected position and said cooperating members of abutment means on said ring means have engaged to stop the rotation of said first ring means, the said element of latch means on said first ring means comprising lug means having a recess therein, and the said element of latch means on said preselector ring means comprising a leaf spring having a free end adapted to engage said lug means to retard the rotational velocity of said first ring means as it approaches its preselected position and to engage the said recess when said first ring has reached its preselected position and said cooperating members of abutment means on said first ring means and on the preselector ring means are in abutting engagement.

8. In combination, a lens mount and an objective lens mounted therein, diaphragm means comprising a stationary ring mounted in said lens mount and first ring means rotatably mounted in said mount and having aperture lamellae therein, preselector ring means rotatably mounted in said mount and adapted for preselecting the desired aperture in said diaphraghm means, cooperating members of abutment means on said first ring means and said preselector ring means, spring means mounted in said mount to rotate said first ring means in a direction to effect engagement of said members, selectively releasable means to maintain said first ring in a position of widest aperture opening against the bias of said spring means and operable to release said first ring means in response to actuation of an actuating member connected therewith, and cooperating elements of latch means on said ring means operable to interengage and hold said first ring means in its rotated position to prevent variation of said aperture lamellae after said spring means has rotated said first ring means to its preselected position and said cooperating members of abutment means on said ring means have engaged to stop the rotation of said first ring means, said element of latch means on said first ring means comprising a peg and said element of latch means on said preselector ring means comprising pawl means adapted to engage said peg and retard the rotational velocity of said first ring means as it approaches its preselected position and to engage said peg when said first ring means reaches its preselected position and the said members of abutment means on said first ring and said preselector ring abut, and lever means adapted to disengage said pawl means from said peg member in response to actuation of said actuating member.

References Cited by the Examiner

UNITED STATES PATENTS

| | | | |
|---|---|---|---|
| 2,612,093 | 9/1952 | Schutz | 95—64 |
| 2,967,472 | 1/1961 | Gebele | 95—64 |

OTHER REFERENCES

German application 1,142,274, January 1963.

JOHN M. HORAN, *Primary Examiner.*

NORTON ANSHER, *Examiner.*

CLIFFORD B. PRICE, *Assistant Examiner.*